(12) United States Patent
Hirai et al.

(10) Patent No.: US 9,304,517 B2
(45) Date of Patent: Apr. 5, 2016

(54) FLOW CONTROL DEVICE

(71) Applicant: Surpass Industry Co., Ltd., Gyoda-shi, Saitama (JP)

(72) Inventors: Kazuki Hirai, Saitama (JP); Hiroki Igarashi, Saitama (JP)

(73) Assignee: SURPASS INDUSTRY CO., LTD., Gyoda-Shi, Saitama (JP)

( * ) Notice: Subject to any disclaimer, the term of this patent is extended or adjusted under 35 U.S.C. 154(b) by 0 days.

(21) Appl. No.: 13/747,848

(22) Filed: Jan. 23, 2013

(65) Prior Publication Data

US 2013/0206254 A1 Aug. 15, 2013

(30) Foreign Application Priority Data

Jan. 26, 2012 (JP) ................................ 2012-014274

(51) Int. Cl.
*F16K 31/12* (2006.01)
*G05D 7/01* (2006.01)
*F16K 31/126* (2006.01)

(52) U.S. Cl.
CPC ............ *G05D 7/012* (2013.01); *F16K 31/1266* (2013.01); *Y10T 137/7737* (2015.04); *Y10T 137/7764* (2015.04)

(58) Field of Classification Search
CPC . G05D 7/012; F16K 31/1266; F16K 31/1268; F16K 27/0236; Y10T 137/7737; Y10T 137/7764
USPC ............... 137/487, 488, 500, 505.14, 505.18, 137/505.39, 505.41, 507, 510
See application file for complete search history.

(56) References Cited

U.S. PATENT DOCUMENTS

| 942,042 A | * | 11/1909 | Petley ........................... 137/465 |
| 2,684,829 A | | 7/1954 | McFarland, Jr. |
| 2,735,441 A | * | 2/1956 | Regna ........................... 137/102 |
| 2,916,255 A | | 12/1959 | Koehler |

(Continued)

FOREIGN PATENT DOCUMENTS

| JP | S6429566 U | 2/1989 |
| JP | 06109163 | 4/1994 |

(Continued)

OTHER PUBLICATIONS

Extended European Search Report dated Jun. 25, 2015, for European Patent Application No. 13152442.3.

*Primary Examiner* — Jessica Cahill
(74) *Attorney, Agent, or Firm* — Thomas, Karceski & Karmilovich, PC

(57) ABSTRACT

A flow control device is capable of performing accurate flow control over a wide range of temperatures by using a housing made of resin with superior chemical resistance. The flow control device includes: a housing made of resin; a diaphragm which is supported in the housing so as to split the housing into a gas chamber side to which gas is introduced and a fluid chamber side through which fluid passes, and is activated by the differential pressure between the gas chamber side and the fluid chamber side; and a valve body which operates in integration with the diaphragm to regulate the flow of the fluid introduced into the fluid chamber side. The gas chamber side includes a holding member which holds the diaphragm between itself and an opposing surface of the fluid chamber side opposite to the diaphragm, the holding member being screwed to the inner peripheral wall of the gas chamber side through a screw part.

3 Claims, 6 Drawing Sheets

(56) References Cited

U.S. PATENT DOCUMENTS

| | | | |
|---|---|---|---|
| 2,981,275 A * | 4/1961 | Young et al. | 137/116.5 |
| 3,113,756 A * | 12/1963 | Griffo | 251/57 |
| 3,183,788 A | 5/1965 | Olsson | |
| 3,557,831 A * | 1/1971 | Katchka | 137/613 |
| 3,588,923 A * | 6/1971 | Haglund et al. | 4/362 |
| 4,050,861 A | 9/1977 | Sakai et al. | |
| 4,171,792 A | 10/1979 | Bass | |
| 4,741,252 A | 5/1988 | Harter et al. | |
| 4,754,777 A * | 7/1988 | Frode | 137/261 |
| 5,358,004 A * | 10/1994 | Atkinson et al. | 137/505.18 |
| 5,609,138 A | 3/1997 | Mutschler | |
| 5,829,473 A | 11/1998 | Hajbi et al. | |
| 5,967,173 A | 10/1999 | Kingsford et al. | |
| 5,983,926 A * | 11/1999 | Mastuzawa | 137/500 |
| 6,415,818 B2 | 7/2002 | Dickman et al. | |
| 6,883,780 B2 | 4/2005 | Browne et al. | |
| 6,988,710 B2 * | 1/2006 | Igarashi | 251/368 |
| 7,467,582 B2 | 12/2008 | Hembree | |
| 7,475,863 B2 * | 1/2009 | Donovan | 251/30.02 |
| 7,487,792 B2 * | 2/2009 | Yoshino et al. | 137/504 |
| 7,690,622 B2 * | 4/2010 | Ito et al. | 251/30.02 |
| 7,905,172 B2 | 3/2011 | Ohrle et al. | |
| 8,104,740 B2 | 1/2012 | Igarashi | |
| 2002/0088496 A1 * | 7/2002 | Kondo | 137/522 |
| 2003/0155546 A1 | 8/2003 | Browne et al. | |
| 2007/0251583 A1 * | 11/2007 | Igarashi | 137/505.18 |
| 2009/0250124 A1 * | 10/2009 | Massengale et al. | 137/535 |
| 2011/0162737 A1 * | 7/2011 | Yamauchi | 137/561 R |

FOREIGN PATENT DOCUMENTS

| | | |
|---|---|---|
| JP | 2000065225 | 3/2000 |
| JP | 2004162774 | 6/2004 |
| JP | 2006057819 | 3/2006 |
| JP | 2008121703 | 5/2008 |
| JP | 2010092406 | 4/2010 |
| WO | WO 2005008108 A2 | 1/2005 |

* cited by examiner

FLOW CONTROL DEVICE

CROSS-REFERENCE TO RELATED APPLICATION(S)

This U.S. Non-Provisional Patent Application relies for priority on Japanese Patent Application No. 2012-014274, filed Jan. 26, 2012.

TECHNICAL FIELD

The present invention relates to a flow control device which controls the flow of chemical solution, purified water, or the like.

BACKGROUND ART

Generally, a flow control device used to regulate the flow of fluid such as chemical solution or purified water used in manufacturing a semiconductor or the like includes a housing formed of a resin material such as a fluororesin which has superior chemical resistance so that the fluid flows in a flow passage provided to the flow control device.

However, the fluororesin being susceptible to thermal deformation such as thermal expansion would cause the housing to thermally expand or the like to undergo thermal deformation when the temperature of the fluid to be regulated changes in a short period of time or when there is a temperature change in the external environment. It is thus concerned that the thermal deformation would cause a seal surface forming the flow passage to be shifted more or less and a seal structure to be lost.

In order to suppress such thermal deformation, Patent Literature 1 discloses a form retaining means which is provided in a housing made of resin and is formed of a metal material undergoing less thermal deformation than the housing material.

CITATION LIST

Patent Literature

Patent Literature 1: Japanese Unexamined Patent Application, Publication No. 2004-162774

SUMMARY OF INVENTION

Technical Problem

The invention described in Patent Literature 1 is adapted for fluid passing through a flow passage with a maximum temperature of approximately up to 100° C. There has been a problem that, when fluid with a temperature of approximately 100° C. or higher is used as has been desired in recent years, the housing formed of the fluororesin would undergo further thermal deformation which cannot be prevented by the metal form retaining means alone.

An object of the present invention is to provide a flow control device capable of performing accurate flow control over a wide range of temperatures by using a housing made of resin with superior chemical resistance.

Solution to Problem

A flow control device according to a first aspect of the present invention includes: a housing made of resin; a diaphragm which is supported in the housing so as to split the housing into a gas chamber side to which gas is introduced and a fluid chamber side through which fluid passes, and is activated by the differential pressure between the gas chamber side and the fluid chamber side; and a valve body which operates in integration with the diaphragm to regulate the flow of the fluid introduced into the fluid chamber side. The gas chamber side includes a holding member which holds the diaphragm between itself and an opposing surface of the fluid chamber side opposite to the diaphragm, the holding member being screwed to the inner peripheral wall of the gas chamber side through a screw part.

That is, the diaphragm is provided between the opposing surface of the fluid chamber side opposite to the diaphragm and the holding member provided on the gas chamber side, while the holding member is screwed to the inner peripheral wall of the gas chamber side through the screw part. Accordingly, the diaphragm held between the holding member and the opposing surface of the fluid chamber side can follow the thermal deformation of the housing when the housing made of resin undergoes the thermal deformation. A seal structure on a contact surface (a seal surface) between the opposing surface of the fluid chamber side and the diaphragm can thus be maintained even when the housing is thermally deformed by the temperature change of the fluid flowing in a flow passage or the temperature change in the installation environment. Therefore, the flow of the high temperature fluid can be regulated accurately.

A flow control device according to a second aspect of the present invention includes: a housing made of resin; a diaphragm which is supported in the housing so as to split the housing into a gas chamber side to which gas is introduced and a fluid chamber side through which fluid passes, and is activated by the differential pressure between the gas chamber side and the fluid chamber side; and a diaphragm-integrated valve body which operates in integration with the diaphragm to regulate the flow of the fluid introduced into the fluid chamber side. The fluid chamber side includes a valve body binding member which holds a valve body-side diaphragm between itself and an opposing surface of the fluid chamber side opposite to the valve body-side diaphragm provided on the outer periphery of the valve body, the valve body binding member being screwed to the inner peripheral wall of the fluid chamber side through a screw part.

That is, the valve body-side diaphragm is provided between the opposing surface of the fluid chamber side opposite to the diaphragm and the valve body binding member provided on the fluid chamber side, while the valve body binding member is screwed to the inner peripheral wall of the fluid chamber side through the screw part. Accordingly, the valve body-side diaphragm held between the valve body binding member and the opposing surface of the fluid chamber side can follow the thermal deformation of the housing when the housing made of resin undergoes the thermal deformation. A seal structure on a contact surface (a seal surface) between the opposing surface of the fluid chamber side and the valve body-side diaphragm can thus be maintained even when the housing is thermally deformed by the temperature change of the fluid flowing in a flow passage or the temperature change in the installation environment. Therefore, the flow of the high temperature fluid can be regulated accurately.

The flow control device according to the first or the second aspect of the present invention may also include a through part which has a small diameter, communicates with the gas chamber side, and is opened on the side wall of the housing.

According to the aforementioned structure, a part of the gas introduced into the gas chamber side would be led outside the housing from the through part which has the small diameter, is opened on the side wall of the housing, and communicates with the gas chamber side. As a result, the gas would flow in the gas chamber side and not be stagnated. The gas flow generated in the gas chamber side can therefore cool the diaphragm even when the diaphragm is heated by the temperature change of the fluid flowing in the flow passage or the temperature change in the installation environment. The housing will also be cooled while the heated diaphragm is cooled. Therefore, the seal structure on the contact surface (the seal surface) between the opposing surface of the fluid chamber side and the diaphragm can be maintained to regulate the flow of the fluid more accurately.

Advantageous Effects of Invention

According to the flow control device in the first aspect of the present invention, the diaphragm held between the holding member and the opposing surface of the fluid chamber side can follow the thermal deformation of the housing when the housing made of resin undergoes the thermal deformation.

According to the flow control device in the second aspect of the present invention, the valve-side diaphragm held between the valve body binding member and the opposing surface of the fluid chamber side can follow the thermal deformation of the housing when the housing made of resin undergoes the thermal deformation.

According to the present invention, the seal structure on the contact surface (the seal surface) between the opposing surface of the fluid chamber side and the diaphragm, or between the opposing surface of the fluid chamber side and the valve body-side diaphragm, can be maintained even when the housing is thermally deformed by the temperature change of the fluid flowing in a flow passage or the temperature change in the installation environment. Therefore, the flow of the high temperature fluid can be regulated accurately.

DESCRIPTION OF EMBODIMENTS

A structure of a flow control device according to an embodiment of the present invention will now be described with reference to an exploded view illustrated in FIG. 1, schematic block diagrams of a vertical section illustrated in FIGS. 2 and 3, a partially enlarged block diagram illustrated in FIG. 4, and an enlarged view of a diaphragm illustrated in FIG. 5. Here, the valve opening of the flow control device is in the fully-closed state in the case illustrated in FIG. 2 and in the fully-open state in the case illustrated in FIG. 3.

Figure 1:
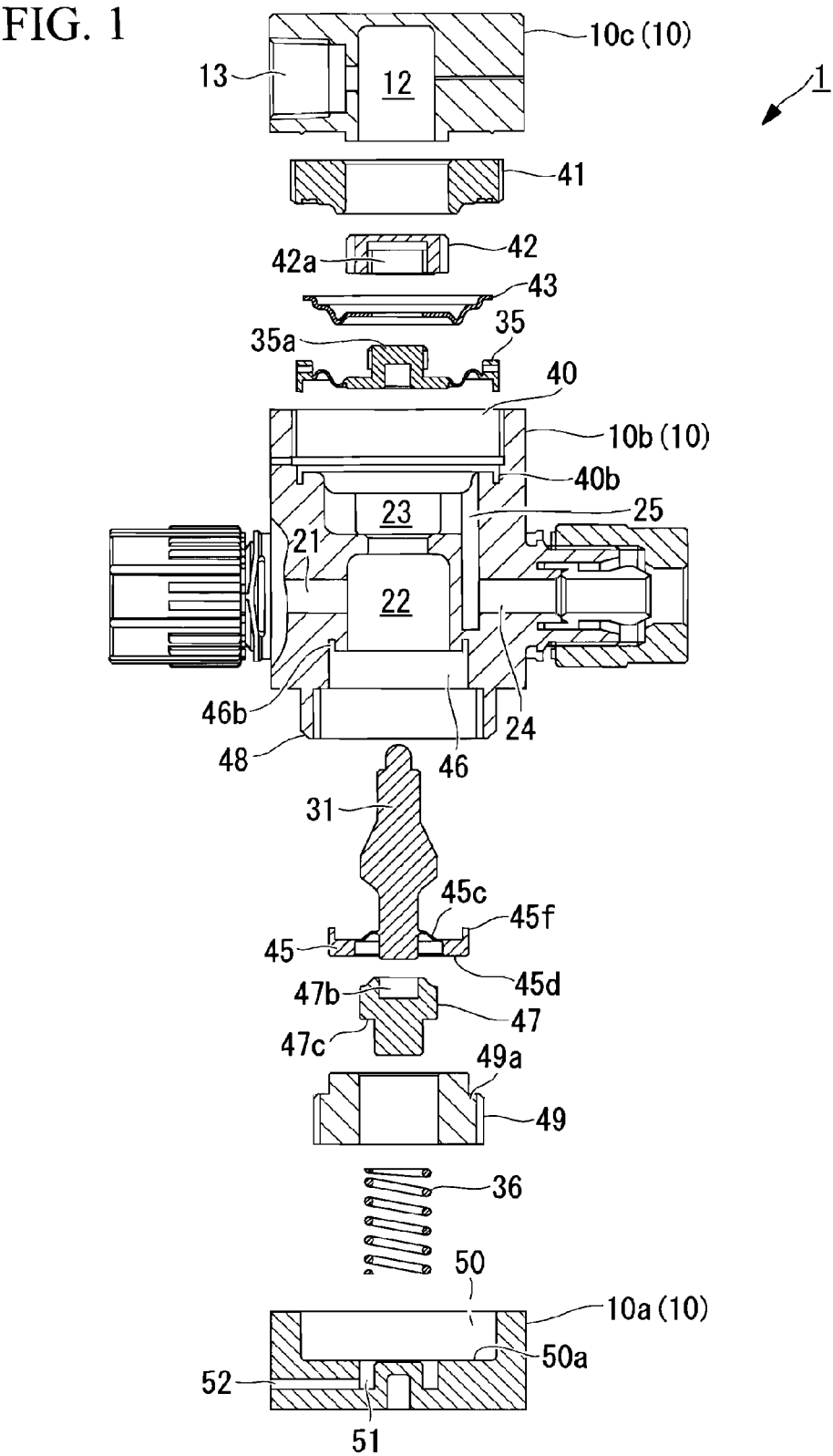
FIG. 1 is an exploded view illustrating a structure of a flow control device according to an embodiment of the present invention.

As illustrated in FIG. 1, a flow control device 1 is used to regulate the flow of fluid such as chemical solution and purified water used in manufacturing a semiconductor or the like, is provided to a supply line (not shown) of the fluid, and is generally referred to as a regulator as well.

Figure 2:
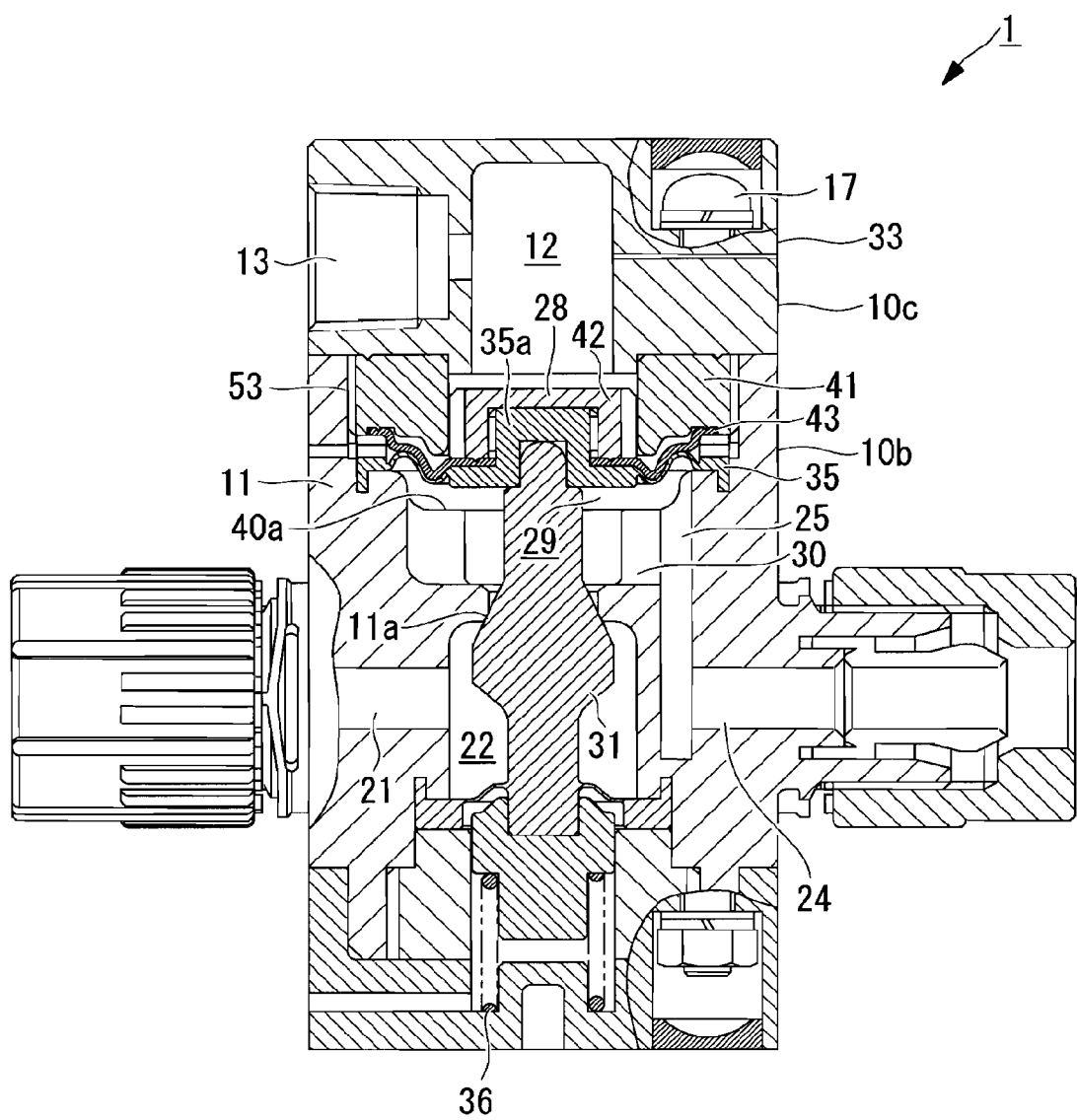
FIG. 2 is a schematic block diagram of a vertical section of the flow control device where the valve opening of the flow control device illustrated in FIG. 1 is in a fully-closed state.

A housing 10 forming the external shape of the flow control device 1 is configured by combining each of three housings 10a, 10b, and 10c, which are fastened by a through-bolt 17 (refer to FIG. 2). The housing 10b among them is formed of a fluororesin such as PTFE or PFA having superior chemical resistance. A material such as PVD or PFA is used to form the housings 10a and 10c.

Each housing 10a, 10b, and 10c constituting the housing 10 will be described. The lower housing 10a formed of PVDF, PFA or the like corresponds to a base part of the flow control device 1. The middle housing 10b arranged above the lower housing 10a and formed of PTFE or PFA resin with superior chemical resistance corresponds to a middle part of the flow control device 1 and includes an inlet port 21, an outlet port 24, a first space 22, a second space 23, a flow passage including a middle flow passage 25, and the like.

The upper housing 10c arranged above the middle housing 10b and formed of PVDF or PFA resin corresponds to an upper part of the flow control device 1. The upper housing 10c presses down a support nut (a holding member) 41, which fixes a diaphragm 35 to the middle housing 10b, to the side of the middle housing 10b and includes, above the support nut 41 and a cap nut 42 provided on the inner peripheral side of the support nut, a pressure chamber (a gas chamber side) 12, a control port 13 which supplies control air (gas) to the pressure chamber 12, and the like.

As illustrated in FIG. 2, for example, the middle housing 10b mainly includes therein: a valve seat 11 having an aperture 11a which communicates with the inlet port 21; a valve body 31 which moves perpendicularly (a vertical direction in FIG. 2) to the aperture 11a of the valve seat 11; a diaphragm 35 which is fitted to a support nut housing part 40 (refer to FIG. 1) formed on the upper end of the middle housing 10b; and a spring 36 which presses the valve body 31 against the valve seat 11.

The flow passage provided in the middle housing 10b includes: the first space 22 (typically referred to as a "valve chamber") which communicates from the inlet port 21 to the valve body 31; the second space 23 which is positioned between the valve seat 11 and a bottom surface 40a of the support nut housing part 40 (refer to FIG. 1); a fluid-side space (a fluid chamber side) 29 formed between the bottom surface 40a of the support nut housing part 40 and the bottom surface of the diaphragm 35; the middle flow passage 25 which communicates from the fluid-side space 29 to the outlet port 24; and a connecting flow passage 30 which is provided at a part of the middle housing 10b between the second space 23 and the middle flow passage 25 to connect the second space 23 and the middle flow passage 25.

As illustrated in FIG. 1, the support nut housing part 40 formed on the upper end surface of the middle housing 10b is depressed downward from the upper end of the middle housing 10b. A screw (not shown) provided on the inner peripheral wall of the support nut housing part 40 is screwed together with a screw (not shown) provided on the outer peripheral wall of the support nut 41 to form a screw part 53 (refer to FIG. 2), so that the support nut 41 can be housed in the support nut housing part 40.

The support nut 41 housed in the support nut housing part 40 is ring-shaped. As illustrated in FIG. 2, the cap nut 42 is housed on the inner peripheral side of the ring-shaped support nut 41. A screw to be screwed together with the screw on the inner peripheral wall of the support nut housing part 40 described above is formed on the outer peripheral wall of the support nut 41. It is preferred that the support nut 41 be formed of the resin material such as PFA, PCTFE, or PEEK having superior temperature and mechanical characteristics.

A depression 42a (refer to FIG. 1) capable of housing the projection 35a provided to the diaphragm 35 is formed on the lower end surface of the cap nut 42 which is housed on the inner peripheral side of the support nut 41. A screw (not shown) provided on the inner peripheral wall of the depression 42a can be screwed together with a screw (not shown) provided on the outer peripheral wall of the projection 35a.

Here, the height of the cap nut 42 (the length in the axial direction of the flow control device 1) is set shorter than the depth of the support nut housing part 40 (the length in the axial direction of the flow control device 1). As a result, as illustrated in FIG. 2, a gas-side space (a gas chamber side) 28 is formed between the upper end surface of the cap nut 42 and the lower end surface of the upper housing 10c. The gas-side space 28 communicates with the pressure chamber 12 when the upper housing 10c is provided on top of the middle housing 10b.

The diaphragm 35 is provided between the lower end surfaces of the support nut 41 and the cap nut 42 and the bottom surface 40a of the support nut housing part 40.

The structure of the diaphragm 35 in the present embodiment will now be described in detail with reference to FIGS. 4 and 5.

Figure 4:
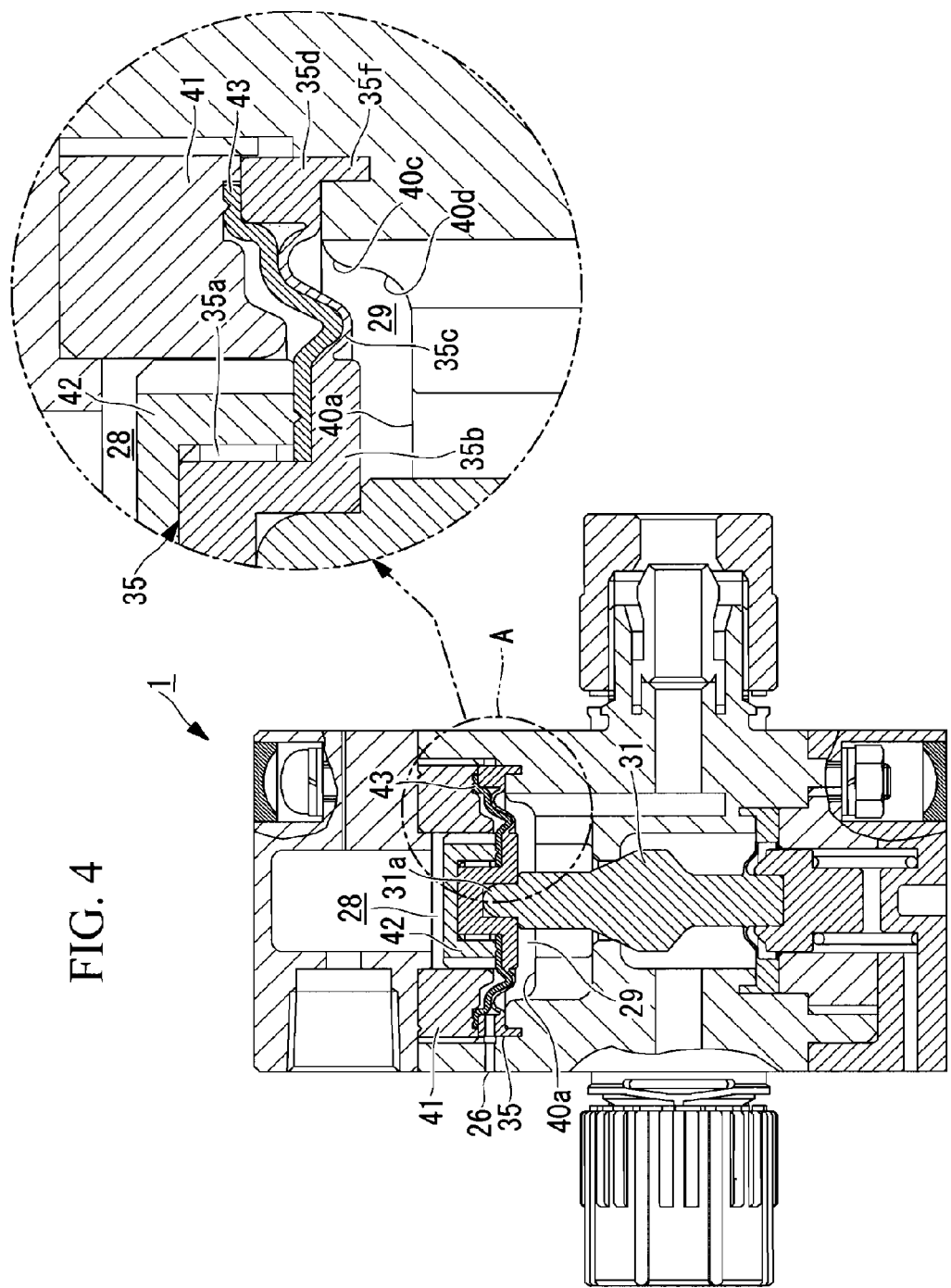
FIG. 4 is a partially enlarged block diagram illustrating a portion A of the flow control device, the valve opening of which illustrated in FIG. 2 is in the fully-closed state.

As illustrated in FIG. 4, the diaphragm 35 is positioned between the lower end surfaces of the support nut 41 and the cap nut 42 and the bottom surface 40a of the support nut housing part 40 (refer to FIG. 1) and is sized to be housed in the support nut housing part 40.

Moreover, a permeation protection sheet 43 to be described later is provided on the top surface of the diaphragm 35.

The external force is applied to the top surface of the diaphragm 35 when the differential pressure is generated between the fluid-side space 29 and the gas-side space 28 described above, thereby causing a thin film part 35c to be described later to be displaced as well as a diaphragm base (a base part) 35b to be moved in the perpendicular direction (the vertical direction in FIG. 4). The valve body 31 in contact with the diaphragm 35 would accordingly move in the perpendicular direction by the movement of the diaphragm base 35b. As a result, the flow of the fluid passing through the flow passage in the flow control device 1 would be regulated.

The diaphragm 35 is formed of a resin material such as PTFE or PFA and is substantially disc-shaped. The outer diameter of the diaphragm is approximately equal to the inner diameter of the support nut housing part 40 (refer to FIG. 1). As illustrated in FIG. 5, the diaphragm 35 includes: the diaphragm base 35b which is provided in the substantially central part; the thin film part 35c which is ring-shaped and provided on the outer rim of the diaphragm base 35b; and a thick outer peripheral edge 35d provided at the outer peripheral edge of the thin film part 35c. Note that the thin film part 35c is thinner than the diaphragm base 35b while the outer peripheral edge 35d is thicker than the thin film part 35c.

The projection 35a which is projected upward is provided on the top surface side of the diaphragm base 35b in the substantially central part thereof. Moreover, a recess 35e, which is concave upward and to which a protrusion 31a (refer to FIG. 4) of the valve body 31 can be inserted, is formed on the bottom surface side of the projection 35a provided to the diaphragm base 35b.

Figure 3:
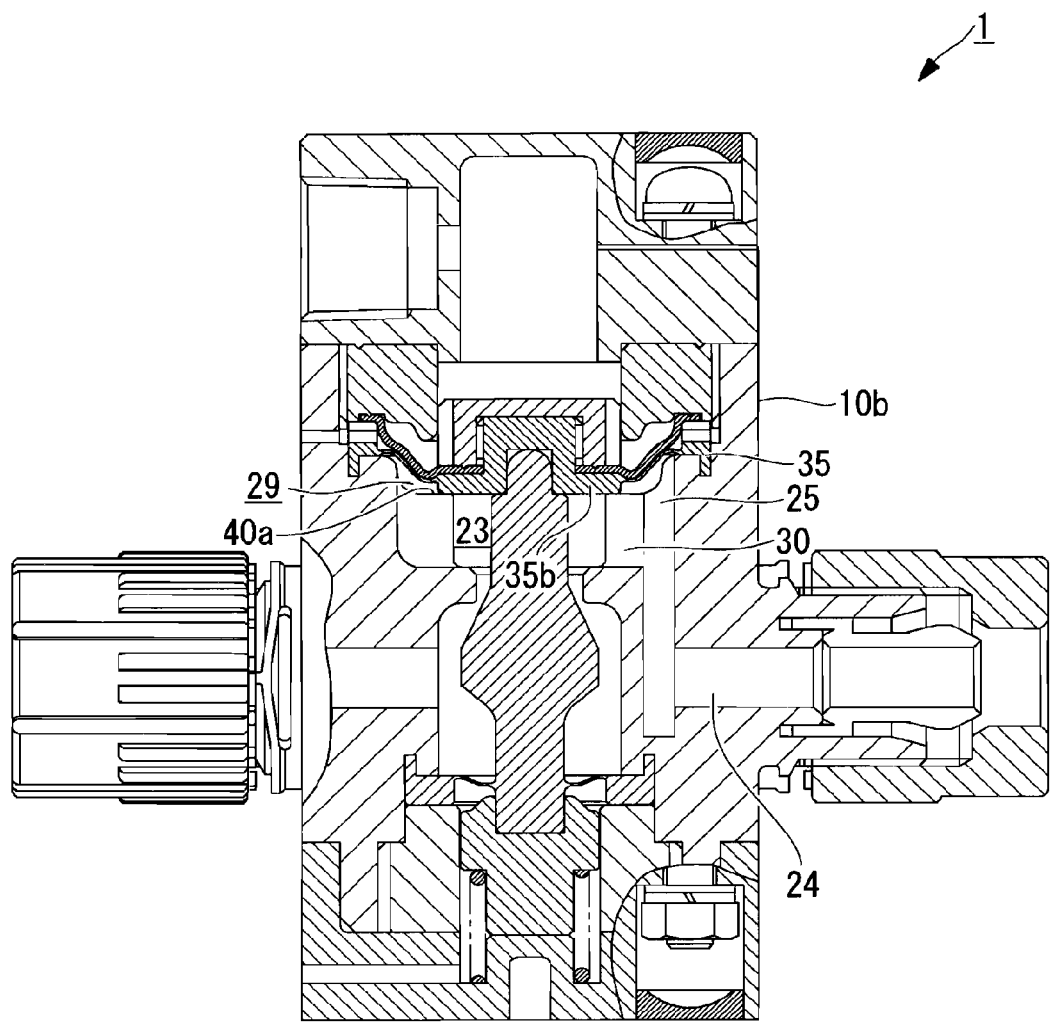
FIG. 3 is a schematic block diagram of a vertical section of the flow control device where the valve opening of the flow control device illustrated in FIG. 1 is in a fully-open state.

When the valve opening of the flow control device 1 is in the fully-open state, as illustrated in FIG. 3, the bottom surfaces of the thin film part 35c and the diaphragm base 35b of the diaphragm 35 are brought into contact with the bottom surface 40a so that the fluid-side space 29 is not formed between the bottom surface of the diaphragm base 35b and the bottom surface 40a.

As illustrated in FIG. 4, for example, the support nut housing part 40 is provided with a step 40c on the substantially outer side of the bottom surface 40a along the radial direction, where the bottom surface 40a on the substantially inner side of the step 40c along the radial direction is depressed below the bottom surface 40a on the substantially outer side of the step 40c.

A protective form (a retaining form) 40d is formed on the bottom surface 40a on the approximately inner side of the step 40c along the radial direction. When the thin film part 35c of the diaphragm 35 is deformed (bent) downward by the pressure of the control air introduced to the gas-side space 28, the protective form (retaining form) 40d can retain the shape of the thin film part 35c by suppressing further downward deformation thereof. The protective form also has a smooth shape along the shape of the thin film part 35c.

Figure 5:
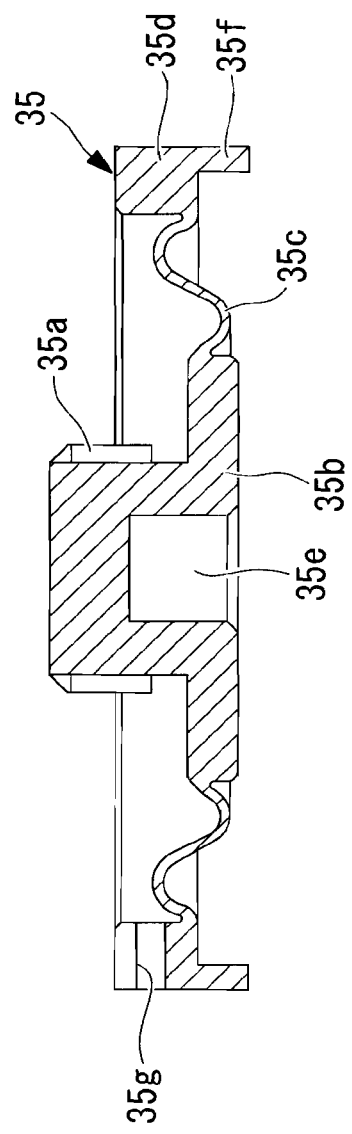
FIG. 5 is an enlarged view of a diaphragm illustrated in FIG. 1.

Moreover, as illustrated in FIG. 5, a gas vent hole 35g is provided to a part of the thick outer peripheral edge 35d forming the diaphragm 35 and passes through the outer peripheral edge from the inner side to the outer side thereof in the radial direction (from the right side to the left side in FIG. 5), for example. As illustrated in FIG. 4, an end of the gas-oriented hole 35g is communicated with a permeating gas vent hole 26 passing through from the support nut housing part 40 toward the outer side of the middle housing 10b along the radial direction.

The gas vent hole 35g is provided to discharge a corrosive gas having permeated the thin film part 35c of the diaphragm 35 to the outside of the flow control device 1 when a chemical solution such as hydrofluoric acid or nitric acid having gas permeability is fed, the corrosive gas being produced by the volatilization of the fluid passing through the fluid-side space 29.

The top surface of the diaphragm 35 is provided with the permeation protection sheet 43 which is formed along the shape of the thin film part 35c to reinforce the thin film part 35c made into a thin film. The permeation protection sheet 43 formed of a highly flexible rubber sheet has a role of preventing the corrosive gas from flowing into the gas-side space 28 from the fluid-side space 29 when the corrosive gas produced from the fluid (a chemical solution such as hydrofluoric acid or nitric acid) flowing in the fluid-side space 29 has permeated the thin film part 35c. Moreover, the permeation protection sheet 43 has a role of sufficiently securing the deformation of the thin film part 35c caused by the pressure of the fluid flowing in the fluid-side space 29 while keeping the strength of the thin film part 35c high against the deformation.

The permeation protection sheet 43 is disc-shaped with no center part to match the shape of the diaphragm 35, while the outer peripheral edge and the inner peripheral edge on the top surface side of the permeation protection sheet 43 are brought into contact with the lower end surface of each of the support nut 41 and the cap nut 42, respectively. The outer peripheral edge on the bottom surface side of the permeation protection sheet 43 is brought into contact with the top surface of the outer peripheral edge 35d of the diaphragm 35. Accordingly, the outer peripheral edge of the permeation protection sheet 43 and the outer peripheral edge 35d of the diaphragm 35 are held between the support nut 41 and the bottom surface 40a of the support nut housing part 40.

Here, the control air from the gas-side space 28 flows between the inner peripheral wall of the support nut 41 and the outer peripheral wall of the cap nut 42, which are not airtight, to the top surface of the permeation protection sheet 43.

A smooth protective form (a retaining form) 41a along the shape of the thin film part 35c and the permeation protection sheet 43 is formed on the lower end surface of the support nut 41. When the thin film part 35c of the diaphragm 35 and the permeation protection sheet 43 provided on the top surface of the thin film part 35c are deformed upward (bent) by the pressure of the fluid flowing into the fluid-side space 29, the protective form can retain the shapes of the thin film part 35c and the permeation protection sheet 43 by suppressing further upward deformation thereof.

As illustrated in FIG. 2, the sealed gas-side space 28 and the pressure chamber 12 can be formed by providing the upper housing 10c above the support nut 41 and the cap nut 42 on the side opposite to where the diaphragm 35 is held between the upper end of the middle housing 10b and the support nut 41 and the cap nut 42. The gas-side space 28 communicates with the pressure chamber 12 formed in the upper housing 10c, whereas the pressure chamber 12 communicates with the control port 13 formed on the side wall of the upper housing 10c.

Provided in the upper housing 10c is an orifice 33 which extends outward in the radial direction from the pressure chamber 12 and is opened on the side wall of the upper housing 10c. The orifice 33 is formed on the extended line of the axial direction of the control port 13, for example. The orifice 33 has an inner diameter of about 0.2 mm, for example, and is adapted to lead (purge) a part of the control air supplied to the pressure chamber 12 of the upper housing 10c out of the upper housing 10c. The amount of the control air led out from the orifice 33 is small enough to not affect the flow control of the fluid performed by the flow control device 1.

As illustrated in FIG. 1, a diaphragm (a valve body-side diaphragm) 45 is integrally provided to the outer periphery of the valve body 31 in the vicinity of the tip (lower end) thereof, the valve body being provided in the middle housing 10b. In addition, the protrusion 31a is provided at the upper end of the valve body 31 into which the diaphragm is integrated.

The diaphragm 45 integrally provided to the valve body 31 includes: a thin film part 45c provided outward in the radial direction from the valve body 31; an outer peripheral edge 45d which is thicker than the thin film part 45c and provided on the outer peripheral edge thereof; and an annular projection 45f which is provided on the top surface of the outer peripheral edge 45d and projected upward.

The outer diameter of the diaphragm 45 is approximately equal to the inner diameter of a diaphragm insertion groove 46 formed at the lower end of the middle housing 10b. When the diaphragm 45 is inserted from the bottom part of the middle housing 10b to be housed in the diaphragm insertion groove 46, the annular projection 45f provided in the diaphragm 45 is fitted to an annular recess 46b provided on the top surface of the diaphragm insertion groove 46 across the outer peripheral edge thereof. A spring folder 47 is provided to the tip of the valve body 31 from below.

A spring folder 47 is provided to the tip of the valve body 31 from below. Provided on the top surface of the spring folder 47 is a protective form 47a which can retain the shape of the thin film part 45c by suppressing further deformation of the thin film part 45c of the diaphragm 45 when the diaphragm 45 integrally provided to the valve body 31 is deformed by the fluid flowing in the first space 22.

A recess 47b which is depressed downward and into which the tip of the valve body 31 can be inserted is formed in the substantially central part of the spring folder 47 on the top surface side thereof. Moreover, the spring folder 47 includes, in the middle of the side wall thereof, a step 47c where the outer diameter of the side wall below the step 47c is smaller than the outer diameter of the side wall above the step 47c. A spring 36 is provided on the outer periphery of the spring folder 47 below the step 47c.

While the spring 36 is provided on the outer periphery of the side wall of the spring folder 47 below the step 47c, a valve body binding member 49 is provided to the spring folder 47 from the lower end side thereof. It is preferred that the valve body binding member 49 be formed of the resin material such as PFA, PCTFE, or PEEK having the temperature and mechanical characteristics superior to those of the lower housing 10a.

The spring 36 can be retained between the inner peripheral wall of the cylindrical valve body binding member 49 and the spring folder 47 provided on the inner peripheral wall, while a step 49a is provided in the middle of the outer peripheral wall of the valve body binding member 49. The outer diameter of the valve body binding member 49 above the step 49a is smaller than below the step 49a. The valve body binding member 49 above the step 49a is inserted into the diaphragm insertion groove 46 from below to be housed therein after the diaphragm 45 is housed in the diaphragm insertion groove 46 of the middle housing 10b.

A screw (not shown) is provided on the outer peripheral wall of the valve body binding member 49 below the step 49a. The valve body binding member 49 can be housed inside an annular lower screwing part 48 by screwing together the screw provided on the outer peripheral wall of the valve body binding member 49 and a screw (not shown) provided on the inner peripheral wall of the lower screwing part 48 which is connected to the lower end of the middle housing 10b.

The lower housing 10a is provided upward to the lower end of the middle housing 10b. A recess 50 which is depressed downward is provided on the top surface of the lower housing 10a. The inner diameter of the recess 50 is approximately equal to the outer diameter of the lower screwing part 48 provided at the lower end of the middle housing 10b. Also provided in a substantially central part of a bottom surface 50a of the recess 50 is a spring groove 51 which can house the lower end of the spring 36 when the spring 36 is housed in the inner peripheral side of the valve body binding member 49.

The lower housing 10a is provided at the lower end of the middle housing 10b by housing the lower screwing part 48 of the middle housing 10b in the recess 50 of the lower housing 10a and housing the lower end of the spring 36 projected below the valve body binding member 49 into the spring groove 51 provided on the bottom surface 50a of the recess 50.

By providing the lower housing 10a to the middle housing 10b in the aforementioned manner, the spring 36 would be disposed between the step 47c of the spring folder 47 and the bottom surface 50a of the lower housing 10a as described above, whereby the valve body 31 can be pressed upward toward the valve seat 11 as illustrated in FIGS. 2 and 3.

As illustrated in FIG. 1, the lower housing 10a capable of pressing the valve body 31 toward the valve seat 11 is provided with an orifice 52 which passes through the lower housing outward in the radial direction from the spring groove 51. Also provided on the side wall of the lower housing 10a is an inlet port (not shown) which communicates with the spring groove 51 to allow air or the like to flow through the port.

The air flowing through the inlet port is purged outside the lower housing 10a from the orifice 52 through the spring groove 51. As a result, the valve body 31, the spring folder 47, and the valve body binding member 49 which are heated by the fluid flowing through the first flow passage 22 can be cooled.

A method of regulating the flow of the fluid by the flow control device 1 configured in the aforementioned manner will be described with reference to FIGS. 2 to 5.

First, as illustrated in FIG. 2, the fluid is introduced into the inlet port 21 of the flow control device 1 from the fluid supply line while the valve opening of the flow control device 1 is in the fully-closed state. The fluid introduced to the inlet port 21 fills the first space 22 because the valve body 31 is in contact with the valve seat 11.

Next, the control air is supplied from the control port 13 provided in the upper housing 10c. As a result, the pressure chamber 12 formed in the upper housing 10c as well as the gas-side space 28 communicating with the pressure chamber 12 are pressurized. By pressurizing the pressure chamber 12 and the gas-side space 28, the diaphragm 35 having acquired the force surpassing the elastic force of the spring 36 provided at the lower part of the middle housing 10b is pressed down. As a result, the valve body 31 is separated from the valve seat 11 through the diaphragm 35. Once the valve body 31 is separated from the valve seat 11, the aperture 11a of the valve seat 11 is opened so that the fluid in the first space 22 would flow into the second space 23.

The distance travelled by the valve body 31 in the perpendicular direction would vary according to the degree of pressure applied to the pressure chamber 12 and the gas-side space 28. The valve opening of the flow control device 1 would thus be adjusted according to the degree of pressurization. As a result, the flow of the fluid passing through the aperture 11a of the valve seat 11 would change by adjusting the valve opening.

As described above, the diaphragm 35 is pressed down when adjusting the flow of the fluid by pressurizing the pressure chamber 12 and the gas-side space 28. That is, the diaphragm base 35b and the thin film part 35c would move downward by the pressure of the control air acting upon the top surface of the diaphragm base 35b and the thin film part 35c of the diaphragm 35 illustrated in FIG. 4.

The fluid having passed through the aperture 11a would flow from the second space 23 into the fluid-side space 29, as illustrated in FIG. 3. The fluid having flowed into the fluid-side space 29 would further flow into the middle flow passage 25. Here, the connecting flow passage 30 is provided between the second space 23 and the middle flow passage 25 in the middle housing 10b as described above.

The connecting flow passage 30 is provided to pass through between a part of the circumferential direction of the second space 23 formed annularly on the outer periphery of the valve body 31 and the middle flow passage 25. The length of the connecting flow passage 30 in the axial direction of the flow control device 1 is approximately equal to the length of the second space 23 in the axial direction of the flow control device 1. A part of the fluid having flowed into the second space 23 would flow out therefrom into the middle flow passage 25 through the connecting flow passage 30.

The fluid having flowed into the middle flow passage 25 from the fluid-side space 29 and the connecting flow passage 30 would flow out toward the outlet port 24. Accordingly, the flow of the fluid in the flow control device 1 can be regulated.

When the flow of the high temperature, high pressure fluid of 180° C. and 500 kPa, for example, is to be regulated by the flow control device 1 of the present embodiment, the fluid passing through the respective flow passages 21 to 25, 29, and 30 formed in the middle housing 10b would induce the middle housing 10b to undergo thermal deformation.

Here, the diaphragm 35 would follow the displacement of the middle housing 10b when the middle housing 10b is thermally deformed, because the diaphragm 35 is held between the support nut 41 and the bottom surface 40a of the support nut housing part 40 (refer to FIG. 1) formed in the middle housing 10b, and because the support nut 41 and the support nut housing part 40 are screwed together by the screw part 53, as illustrated in FIG. 2.

Moreover, the upper housing 10c is provided with the orifice 33 which purges a part of the control air supplied to the pressure chamber 12. By purging the part of the control air supplied to the pressure chamber 12 to the outside of the upper housing 10c through the orifice 33, the air flow would be generated in the pressure chamber 12 and the gas-side space 28 communicating with the pressure chamber 12. As a result, there can be suppressed the stagnation of the gas in the pressure chamber 12 and the gas-side space 28.

The diaphragm 35 and the permeation protection sheet 43 which are heated by the heat of the fluid introduced into the fluid-side space 29 can be cooled by the air flow generated in the pressure chamber 12 and the gas-side space 28 in which the gas stagnation is suppressed. Moreover, the heat of the diaphragm 35 and the permeation protection sheet 43 which has been cooled would propagate into the middle housing 10b, which can also be cooled.

Now, FIG. 3 will be used to describe a case where the valve opening of the flow control device 1 is increased to be in the fully-open state.

As illustrated in FIG. 3, when the valve opening of the flow control device 1 is in the fully-open state, the diaphragm base 35b of the diaphragm 35 is in contact with the bottom surface 40a of the middle housing 10b.

The second space 23 and the fluid-side space 29 would not be communicated with each other since the diaphragm base 35b is in contact with the bottom surface 40a. As a result, the fluid would not flow into the fluid-side space 29 or from the fluid-side space 29 to the middle flow passage 25.

However, the connecting flow passage 30 provided in a part of the middle housing 10b in the flow control device 1 would allow the fluid having flowed into the second space 23 to flow from the second space 23 to the middle flow passage 25 through the connecting flow passage 30. Therefore, the fluid can flow with the maximum flow (the flow of the fluid when the valve opening is in the fully-open state) toward the outlet port 24 and out by way of the connecting flow passage 30 even when the valve opening of the flow control device 1 is in the fully-open state and the diaphragm base 35b is in contact with the bottom surface 40a.

The following effect can be attained by the flow control device 1 according to the present embodiment.

The diaphragm 35 is provided between the bottom surface (the opposing surface) 40a of the support nut housing part 40 and the support nut (the holding member) 41 provided in the gas-side space (the gas chamber side) 28, the bottom surface opposing the diaphragm 35 and forming the fluid-side space (the fluid chamber side) 29. The support nut 41 is screwed to the inner peripheral wall of the support nut housing part 40 through the screw part 53. Accordingly, the diaphragm 35 held between the support nut 41 and the bottom surface 40a forming the fluid-side space 29 can follow the thermal deformation of the middle housing 10b when the middle housing (the housing) 10b made of resin undergoes the thermal deformation. The seal structure on the contact surface (the seal surface) between the bottom surface 40a of the support nut housing part 40 forming the fluid-side space 29 and the diaphragm 35 can thus be maintained even when the housing 10 is thermally deformed by the temperature change of the fluid flowing in the flow passages 21 to 25, 29, and 30, or the temperature change in the installation environment. Therefore, the flow of the high temperature fluid can be regulated accurately.

A part of the control air (gas) introduced into the pressure chamber 12 is led outside the upper housing 10c from the orifice (through part) 33 which is opened on the side wall of the upper housing (the housing) 10c, communicates with the pressure chamber 12, and has the small diameter. As a result, the control air would flow in the pressure chamber 12 and would not be stagnated. Here, the control air supplied to the pressure chamber 12 is led to the gas-side space 28 which communicates with the pressure chamber 12. The diaphragm 35 can thus be cooled by the flow of the control air generated in the pressure chamber 12 and the gas-side space 28 even when the diaphragm 35 is heated by the temperature change of the fluid flowing in the flow passages 21 to 25, 29, and 30 that are formed in the middle housing 10b, or the temperature change in the installation environment. The middle housing 10b will also be cooled while the heated diaphragm 35 is cooled. Therefore, the seal structure on the contact surface (the seal surface) between the bottom surface 40a of the support nut housing part 40 and the diaphragm 35 can be maintained to perform the flow control of the fluid more accurately.

While it has been described in the present embodiment that the housing 10 is formed of the resin material such as PVDF, PFA, or PTFE, the present invention is not limited thereto and may also adopt a resin material such as PPS or P.P.

Moreover, as a modification of the present embodiment, a control means for controlling the upward movement of the valve body 31 may be provided to slightly open the aperture 11a of the valve seat 11 when the valve opening of the flow control device 1 is in a closed state, so that dust (particles) would not be produced by bringing the valve body 31 and the valve seat 11 into contact with each other.

Figure 6:
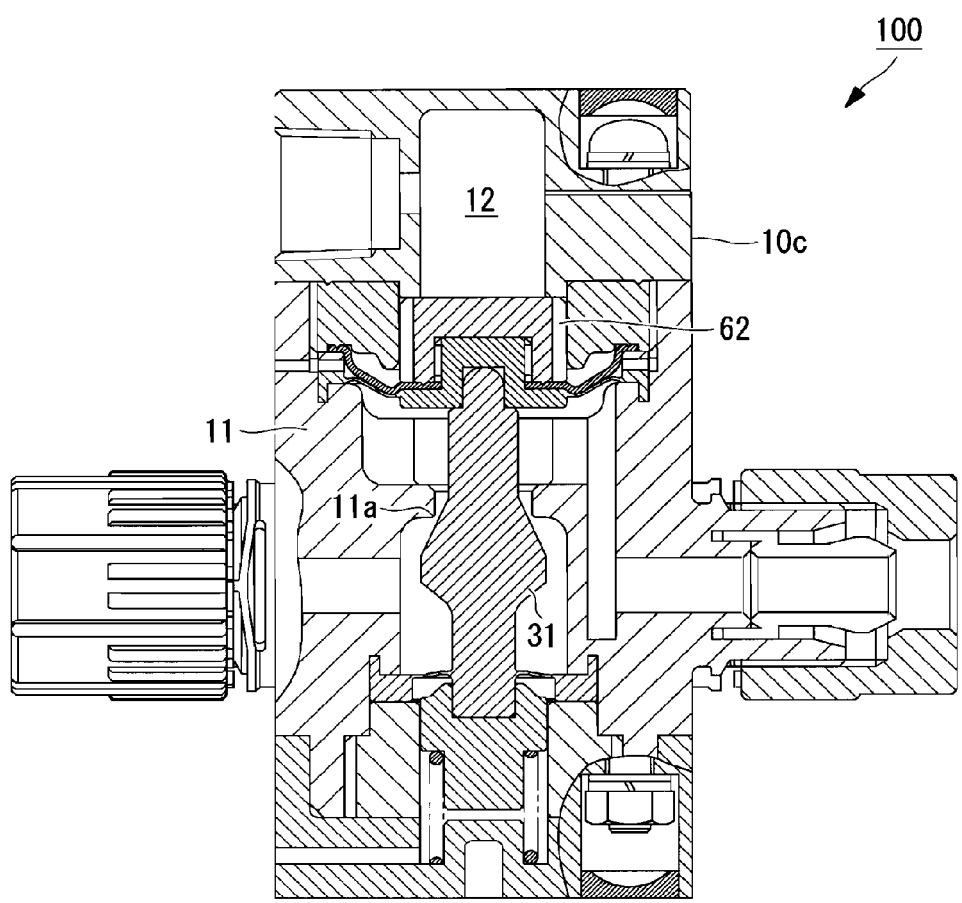
FIG. 6 is a schematic block diagram of a vertical section of a flow control device according to a modification of the present invention.

A flow control device 100 according to the modification of the present invention is illustrated in FIG. 6.

The flow control device 100 is provided with a cap nut (a control means) 62 which controls the upward movement of the valve body 31 to prevent the generation of dust. The cap nut 62 is different from the cap nut 42 (refer to FIG. 2) of the aforementioned embodiment in terms of the height only. That is, the height of the cap nut 62 of the present modification is greater (longer) than that of the cap nut 42 illustrated in FIG. 2.

The bottom surface of the upper housing 10c is brought into contact with the top surface of the cap nut 62 by making the cap nut 62 tall as illustrated in FIG. 6, so that the gas-side space 28 (refer to FIG. 2) is not formed between the bottom surface of the upper housing 10c and the top end surface of the cap nut 62. As a result, the valve body 31 would be slightly moved upward in the perpendicular direction with respect to the aperture 11a of the valve seat 11 so that the valve body 31 and the valve seat 11 are not in contact with each other even when the control air is not supplied to the pressure chamber 12 (when the valve opening of the flow control device 100 is in the closed state).

Since the valve body 31 and the valve seat 11 are not in contact with each other, there can be prevented the dust (particles) generated by bringing the valve body 31 and the valve seat 11 into contact with each other as illustrated in FIG. 2 of the aforementioned embodiment.

REFERENCE SIGNS LIST

1 flow control means
10,10b housing (housing, middle housing)
28 gas chamber side (gas-side space)
29 fluid chamber side (fluid-side space)
31 valve body
35 diaphragm
40a opposing surface (bottom surface)
41 holding member (support nut)
45 diaphragm (valve body-side diaphragm)
53 screw part

The invention claimed is:

1. A flow control device comprising:
a housing made of resin;
a diaphragm which is supported in the housing so as to split the housing into a gas chamber side to which gas is introduced and a fluid chamber side through which fluid passes, and is activated by differential pressure between the gas chamber side and the fluid chamber side;
a valve body which operates in integration with the diaphragm to regulate a flow of the fluid introduced into the fluid chamber side; and
a permeation protection sheet which prevents corrosive gas produced from the fluid of the fluid chamber side from flowing into the gas chamber side, the permeation protection sheet being disc-shaped with no center part,
wherein the gas chamber side includes a first holding member which holds the diaphragm and the permeation protection sheet between itself and an opposing surface of the fluid chamber side opposite to the diaphragm and a second holding member which holds the permeation protection sheet between itself and a diaphragm base, the diaphragm base being provided in a central part of the diaphragm and being projected upward,
wherein a housing part which houses the first holding member is formed on the housing, a first screw part being formed on an inner peripheral surface of the housing part,
wherein a second screw part which is screwed together with the first screw part is formed on an outer peripheral surface of the first holding member,
wherein an outer peripheral edge of the diaphragm and an outer peripheral edge of the permeation protection sheet are held between an end surface of the first holding member and a bottom surface of the housing part, and
wherein an inner peripheral edge of the permeation protection sheet is held between an end surface of the second holding member and the diaphragm base.

2. The flow control device according to claim 1, comprising a through part which communicates with the gas chamber side, and is opened on a side wall of the housing.

3. The flow control device according to claim 1,
wherein the diaphragm is substantially disc-shaped, and
wherein an outer diameter of the diaphragm is approximately equal to the inner diameter of the housing part.

* * * * *